(No Model.)

H. L. TYLER.
MEANS FOR CLOSING AN ELECTRIC CIRCUIT.

No. 494,765. Patented Apr. 4, 1893.

Witnesses:
J. M. Withrow
Chas. S. Hyer

Inventor,
Harry L. Tyler;
By his Attorneys,
C. A. Snow & Co.

THE NORRIS PETERS CO., PHOTO-LITHO., WASHINGTON, D. C.

UNITED STATES PATENT OFFICE.

HARRY L. TYLER, OF CORNING, NEW YORK.

MEANS FOR CLOSING AN ELECTRIC CIRCUIT.

SPECIFICATION forming part of Letters Patent No. 494,765, dated April 4, 1893.

Application filed August 20, 1892. Serial No. 443,633. (No model.)

*To all whom it may concern:*

Be it known that I, HARRY L. TYLER, a citizen of the United States, residing at Corning, in the county of Steuben and State of New York, have invented a new and useful Means for Closing an Electrical Circuit, of which the following is a specification.

This invention relates to means for automatically closing an electrical circuit, or a number of circuits, and adapted for use in connection with any circuit or source of electrical energy, and for the purpose of illustrating one application of the invention it is shown used with an ordinary bell circuit to constitute an automatic alarm, but may be employed equally well with all devices requiring an electrical contact between two electrodes to perform certain desirable functions.

The invention consists of a vibrating diaphragm or analogous device in an electrical circuit having a reflecting surface and that is so constructed as to make the circuit through the medium of the sensitive action of light coming in contact with the exposed reflecting surface, the amplitude of vibration of the said diaphragm or analogous device being increased or decreased proportionately with the intensity of the light and the sensitiveness of the reflecting surface.

The invention further consists in changing the position of the diaphragm in such manner as to make it sensitive to darkness or the sudden extinguishing or absence of light.

The object of the invention is to provide a device that will automatically extinguish lights such as are located in public places, give an alarm when a light is extinguished, to detect the unknown entrance into a lighted room and turning off of the light act as a general alarm to detect the presence of burglars by the introduction of a light by the latter into an apartment, or the extinguishment of a light that has been burning or give notice of escaping gas, if the flames thereof be accidentally blown out and also to perform the function of an automatic circuit closer in general.

Figure 1:
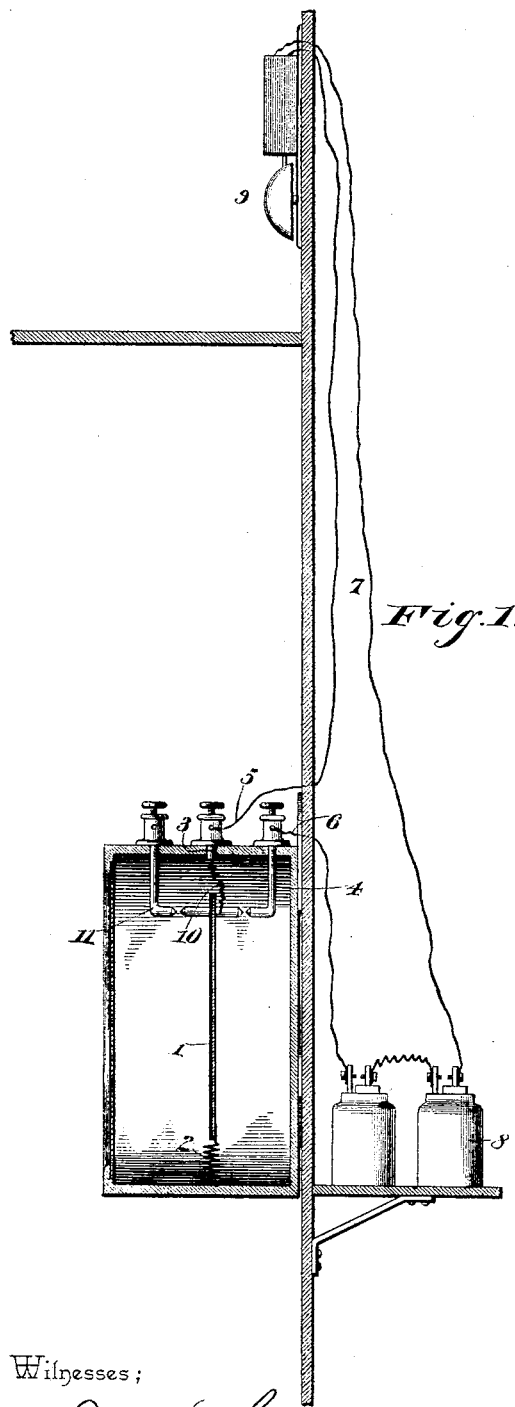
Figure 2:
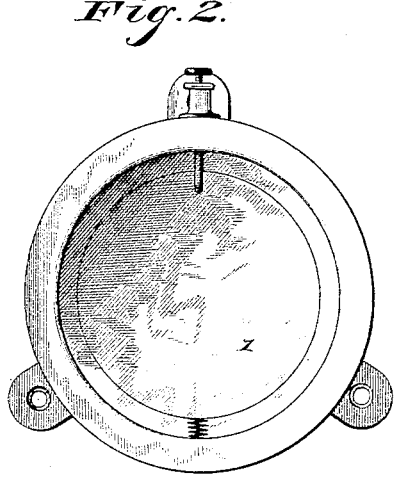

In the drawings:—Figure 1, is a sectional view, showing a supporting frame, a bell circuit, and the light sensitive diaphragm. Fig. 2, is a front elevation of the diaphragm and its support.

Similar numerals of reference are used to indicate corresponding parts in the several figures.

Referring to the drawings, for the purpose of illustrating one application of the invention, the numeral 1 designates a diaphragm or analogous device mounted on or held by a spring 2 or an analogous yielding support which permits of movement or vibration of the diaphragm when affected by light. The said diaphragm, by its movement contacts with either one of two terminals 3 and 4 extending from a switch or binding posts and to which the two ends 5 and 6 of a circuit 7 may be attached, and in the present instance said circuit includes a battery 8 and bell 9. The diaphragm 1, as shown is electrically attached by a connection 10, or other device of an equivalent nature, with the projection 3, and when the said diaphragm is vibrated and moves by the light striking the sensitive or reflecting surface thereof, the circuit will be made through the diaphragm, the connection 10, terminal 3, bell 9, to battery 8, from battery back through terminal 6 to projection 4 and again to the diaphragm. This of course will actuate the bell as a signal. Instead of the bell 9, a relay, gas operating device, a switch or a cut out may be as readily employed with the same efficiency of operation, to extinguish light, or to close a circuit and also cause a generation of light. At the proper time and by suitable means the circuit 7 will be broken by the return of the diaphragm to its normal position through the medium of the yielding or resilient support 2.

If it be desired to arrange the diaphragm to act by the absence of light and when darkness occurs, another terminal 11 is provided to which end 6 of the circuit wire may be secured and in this instance the yielding support 2 would be arranged in such manner as to make the normal position of the diaphragm in contact with or against the terminal 11, and the circuit normally closed, but by the sensitive nature of the diaphragm when affected by light it would be forced back in contact with or against the terminal 4 and thereby abnormally open the circuit. Therefore, it will be seen that as soon as the light was removed or darkness ensue, the yielding support 2 would act and throw or move the diaphragm back against the terminal 11 and close the circuit to actuate a signal or other device.

The terminals in this device could be varied and changed at will, and switches introduced when found applicable and useful, all of which changes would be within the scope of an electrician and be readily understood and appreciated by those skilled in the art.

Having thus described the invention, what is claimed as new is—

1. The combination of an electrical circuit, terminals, and a movable diaphragm sensitive to the action of light.

2. The combination of an electrical circuit having suitable terminals, and a movable diaphragm in said circuit having a reflecting surface and caused to vibrate through the action of light on said surface to control said circuit.

3. The combination of an electrical circuit having suitable terminals, and a movable diaphragm in said circuit having a yielding support at one side and freely movable between the terminals at the opposite side and provided with a reflecting surface and caused to vibrate through the action of light on said surface to control said circuit.

In testimony that I claim the foregoing as my own I have hereto affixed my signature in the presence of two witnesses.

HARRY L. TYLER.

Witnesses:
JOHN H. SIGGERS,
CHAS. S. HYER.